United States Patent
Kawano et al.

(10) Patent No.: US 7,154,646 B2
(45) Date of Patent: Dec. 26, 2006

(54) OPTICAL RECORDING APPARATUS AND OPTICAL RECORDING/REPRODUCING APPARATUS

(75) Inventors: Katsunori Kawano, Ashigarakami-gun (JP); Jiro Minabe, Ashigarakami-gun (JP); Tatsuya Maruyama, Ashigarakami-gun (JP); Shin Yasuda, Ashigarakami-gun (JP); Norie Matsui, Ashigarakami-gun (JP); Tsutomu Ishii, Ebina (JP); Kazuhiro Hama, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/411,873

(22) Filed: Apr. 27, 2006

(65) Prior Publication Data

US 2006/0193022 A1    Aug. 31, 2006

Related U.S. Application Data

(62) Division of application No. 10/660,485, filed on Sep. 12, 2003, now Pat. No. 7,064,875.

(30) Foreign Application Priority Data

Mar. 24, 2003    (JP) ............................. 2003-81456

(51) Int. Cl.
*G03H 1/12*    (2006.01)
(52) U.S. Cl. .......................................... 359/11; 359/30
(58) Field of Classification Search .................. None
See application file for complete search history.

(56) References Cited

U.S. PATENT DOCUMENTS 6,452,890 B1 * 9/2002 Kawano et al. ........ 369/110.01
6,909,529 B1   6/2005 Curtis

FOREIGN PATENT DOCUMENTS

JP    A 11-311938    11/1999

OTHER PUBLICATIONS

Katsunori Kawano et al. "Holographic Recording and Retrieval of Polarized Light by Use of Polyester Containing Cyanoazobenzene Units in the Side Chain" Sep. 15, 1999 pp. 1269-1271 of vol. 24, No. 18, *Optics Letters*.

* cited by examiner

*Primary Examiner*—Euncha P. Cherry
(74) *Attorney, Agent, or Firm*—Oliff & Berridge, PLC

(57) ABSTRACT

An optical recording/reproducing apparatus having excellent resistance against vibration and noise. In recording, coherent light is polarization-modulated with a spatial light modulator to generate signal light and reference light whose polarization directions are crossed at right angles. The signal light permeates a polarizing beam splitter, and is incident to a quarter wavelength plate. The reference light passes through a passing hole, is diffused by a light diffuser and is incident to the quarter wavelength plate. The reference and signal light are converted into circularly polarized light which revolve in directions opposite to each other and condensed by a condenser lens, and then a predetermined area of an optical recording medium is irradiated with the reference and signal light. Thus, the reference and signal light are generated by modulating the incident light from the same light source and are coaxially incident to the polarizing beam splitter.

6 Claims, 5 Drawing Sheets

OPTICAL RECORDING APPARATUS AND OPTICAL RECORDING/REPRODUCING APPARATUS

CROSS-REFERENCE TO RELATED APPLICATION

This is a divisional application of U.S. patent application Ser. No. 10/660,485 filed Sep. 12, 2003 now U.S. Pat. No. 7,064,875, the disclosure of which is incorporated by reference herein.

This application claims priority under 35 USC 119 from Japanese Patent Application No. 2003-081456, the disclosure of which is incorporated by reference herein.

BACKGROUND OF THE INVENTION

1. Field of the Invention

The present invention relates to an optical recording apparatus and an optical recording/reproducing apparatus, and particularly relates to an optical recording apparatus for recording information in an optical recording medium as a hologram and an optical recording/reproducing apparatus for recording information in an optical recording medium as a hologram and for reproducing the recorded information.

2. Description of the Related Art

Generally, an incident angle for diffracting light must be more precise as a hologram becomes thicker. The diffracted light disappears even if the incident angle is slightly shifted from Bragg condition. In a volume holographic memory, an angle multiplexing method utilizes this selectivity of the angle. That is, a plurality of holograms are formed in the same volume in such a manner that the angle of reference light is changed by two-beam interference in which interference fringes obtained by crossing signal light and the reference light are recorded. An arbitrary hologram can be read without a crosstalk by irradiation of reading light at the same incident angle as that of the reference light used in recording. However, it is a problem that the hologram recording by the two-beam interference is susceptible to vibration, and the recording must be carried out while the recording medium is stopped. There are other problems that an optical system becomes complicated and a drive apparatus is enlarged and the like.

Recently, "polarized collinear recording" has been proposed in order to overcome the problems in the two-beam interference, and has become commercially practical (Japanese Patent Application Laid-Open (JP-A) No. 11-311938). The "polarized collinear recording" is a method for recording the hologram, in which the reference light and the signal light are coaxially arranged and the recording medium is irradiated with the reference light and the signal light by using one objective lens. According to the method, using a servo technology can improve stability of recording/reproducing against the vibration, and miniaturization of the apparatus can be achieved.

The recording method of the "polarized collinear recording" will be described below referring to FIG. 4. P-polarized light, which is emitted from a light source device 125, is incident to a spatial light modulator 118 though a prism block 119, and the light is spatially modulated to become signal light. The signal light passes through a prism block 115 and is incident to a two-split azimuth rotator plate 114. Azimuth rotator plates 114L and 114R are provided in the two-split azimuth rotator plate 114. A polarization direction of the light, which has passed through the azimuth rotator plate 114L, is rotated by +45° to become A-polarized light, and a polarization direction of the light, which has passed through the azimuth rotator plate 114R, is rotated by −45° to become B-polarized light. The signal light which has passed through the two-split azimuth rotator plate 114 is condensed by an objective lens 112, and an optical information recording medium 101 is irradiated with the signal light.

On the other hand, in the light incident to a phase spatial light modulator 117 from the prism block 119, the phase is spatially modulated to become reference light for recording. The reference light for recording passes through a convex lens 116 and the prism block 115 and is incident to the two-split azimuth rotator plate 114. The reference light for recording which has passed through the two-split azimuth rotator plate 114 is condensed by the objective lens 112, and the optical information recording medium 101 is irradiated with the reference light for recording.

In a hologram layer 103 of the optical information recording medium 101, the signal light which is reflected by a reflection coating 105, having the same polarization direction, interferes with the reference light for recording proceeding toward the reflection coating 105 to form an interference pattern, and the interference pattern is recorded in the same volume.

The reproducing method of the "polarized collinear recording" will be described below referring to FIG. 5. P-polarized light, which is emitted from the light source device 125, is incident to the phase spatial light modulator 117 though the prism block 119, and the phase of the light is spatially modulated to become reference light for reproducing. The reference light for reproducing passes through the convex lens 116 and the prism block 115 and is incident to the two-split azimuth rotator plate 114. The polarization direction of the reference light for reproducing which has passed through the two-split azimuth rotator plate 114 is rotated and condensed by the objective lens 112, and the optical information recording medium 101 is irradiated with the reference light for reproducing.

When the optical information recording medium 101 is irradiated with the reference light for reproducing, reproducing light corresponding to the signal light in the recording is generated. The reproducing light passes through the objective lens 112 and the two-split azimuth rotator plate 114 to become S-polarized light. The reproducing light which has passed through the two-split azimuth rotator plate 114 passes through the prism block 115 and the spatial light modulator 118, and part of light quantity of the reproducing light is reflected by a half-reflecting surface 119b of the prism block 119 and detected by a CCD array 120.

However, the "polarized collinear recording" has the following disadvantages. 1) The reference light is reflected to follow the same light path for the reproducing light, the reference light can not be separated by a polarizing beam splitter, and a noise is generated in the reproducing. 2) The light path of the signal light does not completely coincide with that of the reference light, and the apparatus is still susceptible to vibration.

In view of the foregoing, it is an object of the present invention to provide an optical recording apparatus having excellent resistance against vibration. It is another object of the present invention to provide an optical recording/reproducing apparatus having excellent resistance against vibration and excellent resistance against noise.

SUMMARY OF THE INVENTION

In order to achieve the above-described object, an optical recording apparatus of a first aspect of the present invention comprises a spatial light modulator which modulates light incident from a single light source and generates signal light having a predetermined polarization direction modulated according to a signal to be recorded in an optical recording medium and reference light having a polarization direction crossed at right angles with the predetermined polarization direction, a wavelength plate which converts linearly polarized light into circularly polarized light and converts circularly polarized light into linearly polarized light, and a condensing optical system which condenses the light incident from the wavelength plate into a predetermined area of the optical recording medium, wherein a hologram is recorded in the optical recording medium in such a manner that the spatial light modulator generates the signal light and the reference light, the wavelength plate converts the generated signal light and the generated reference light into the circularly polarized light in which the signal light and the reference light revolve in directions opposite to each other, and the condensing optical system condenses the circularly polarized light, which has been converted with the wavelength plate and in which the signal light and the reference light revolve in directions opposite to each other, into a predetermined area of the optical recording medium.

In the optical recording apparatus of the invention, since the signal light and the reference light whose polarization directions are crossed at right angles with each other are generated from the light incident from the single light source, the signal light and the reference light are always coaxial, optical axes of the signal light and the reference light are never shifted even if the vibration is applied to the apparatus, and the apparatus has excellent resistance against vibration.

In the optical recording apparatus, a holographic optical element forming a predetermined wavefront for the reference light may be further arranged between the spatial light modulator and the wavelength plate. It is preferable that the holographic optical element is a light diffuser which diffuses the reference light. All data of the signal light can be recorded without a dropout in such a manner that the reference light is diffused and the area wider than that of the signal light is irradiated with the reference light.

A liquid crystal panel for a projector comprising a transmissive liquid crystal cell in which transparent electrodes are formed on both surfaces of a plate-shaped liquid crystal, a first polarizing plate which is arranged on a light incident side of the liquid crystal cell and transmits the light of the predetermined polarization direction, and a second polarizing plate which is arranged on a light outgoing side of the liquid crystal cell and transmits the light of any polarization direction at a central portion thereof and transmits the light of the predetermined polarization direction at a portion thereof surrounding the central portion, can be used as the spatial light modulator.

Instead of the wavelength plate, an azimuth rotator rotating the polarization direction by a predetermined angle may be provided. The hologram can be recorded in the optical recording medium in such a manner that polarization directions of the signal light and the reference light, which have been generated by the spatial light modulator, are rotated by the predetermined angle using the azimuth rotator, and the condensing optical system condenses the linearly polarized light whose polarization direction is rotated by the azimuth rotator into the predetermined area of the optical recording medium.

In order to achieve the above-described object, an optical recording/reproducing apparatus of a second aspect of the invention comprises a spatial light modulator which modulates light incident from a single light source and generates signal light having a predetermined polarization direction modulated according to a signal to be recorded in an optical recording medium and reference light having a polarization direction crossed at right angles with the predetermined polarization direction, a polarizing beam splitter which transmits light incident from the light source irrespective of a polarization direction thereof, reflects reproducing light incident from the optical recording medium toward a predetermined direction according to a polarization direction thereof, and transmits the light incident from the optical recording medium except for the reproducing light irrespective of a polarization direction thereof, a wavelength plate which converts linearly polarized light into circularly polarized light and converts circularly polarized light into linearly polarized light, and a condensing optical system which condenses light incident from the wavelength plate into a predetermined area of the optical recording medium, wherein in the case that a hologram is to be recorded in the optical recording medium, the spatial light modulator generates the signal light and the reference light, the wavelength plate converts the generated signal light and the generated reference light into the circularly polarized light in which the signal light and the reference light revolve in directions opposite to each other, and the condensing optical system condenses the circularly polarized light, which has been converted by the wavelength plate and in which the signal light and the reference light revolve in directions opposite to each other, into a predetermined area of the optical recording medium, and in the case that the hologram recorded in the optical recording medium is to be reproduced, the spatial light modulator generates the reference light, the wavelength plate converts the generated reference light into the circularly polarized light, the condensing optical system condenses the circularly polarized light into a predetermined area of the optical recording medium, the wavelength plate converts the obtained reproducing light into the linearly polarized light, and the polarizing beam splitter reflects the converted linearly polarized light toward a predetermined direction.

In the optical recording/reproducing apparatus of the invention, since the signal light and the reference light whose polarization directions are crossed at right angles with each other are generated from the light incident from the single light source, the signal light and the reference light are always coaxial, optical axes of the signal light and the reference light are never shifted even if the vibration is applied to the apparatus, and the apparatus has excellent resistance against vibration. Further, even if the reference light with which the optical recording medium has been irradiated in the reproducing is reflected, the reference light passes through the polarizing beam splitter without being reflected. Accordingly, the needless light is not detected as the noise, and the apparatus has excellent resistance against noise.

DETAILED DESCRIPTION OF THE INVENTION

Referring to the accompanying drawings, embodiments of the present invention will be described below in detail.

[First Embodiment]

Figure 1:
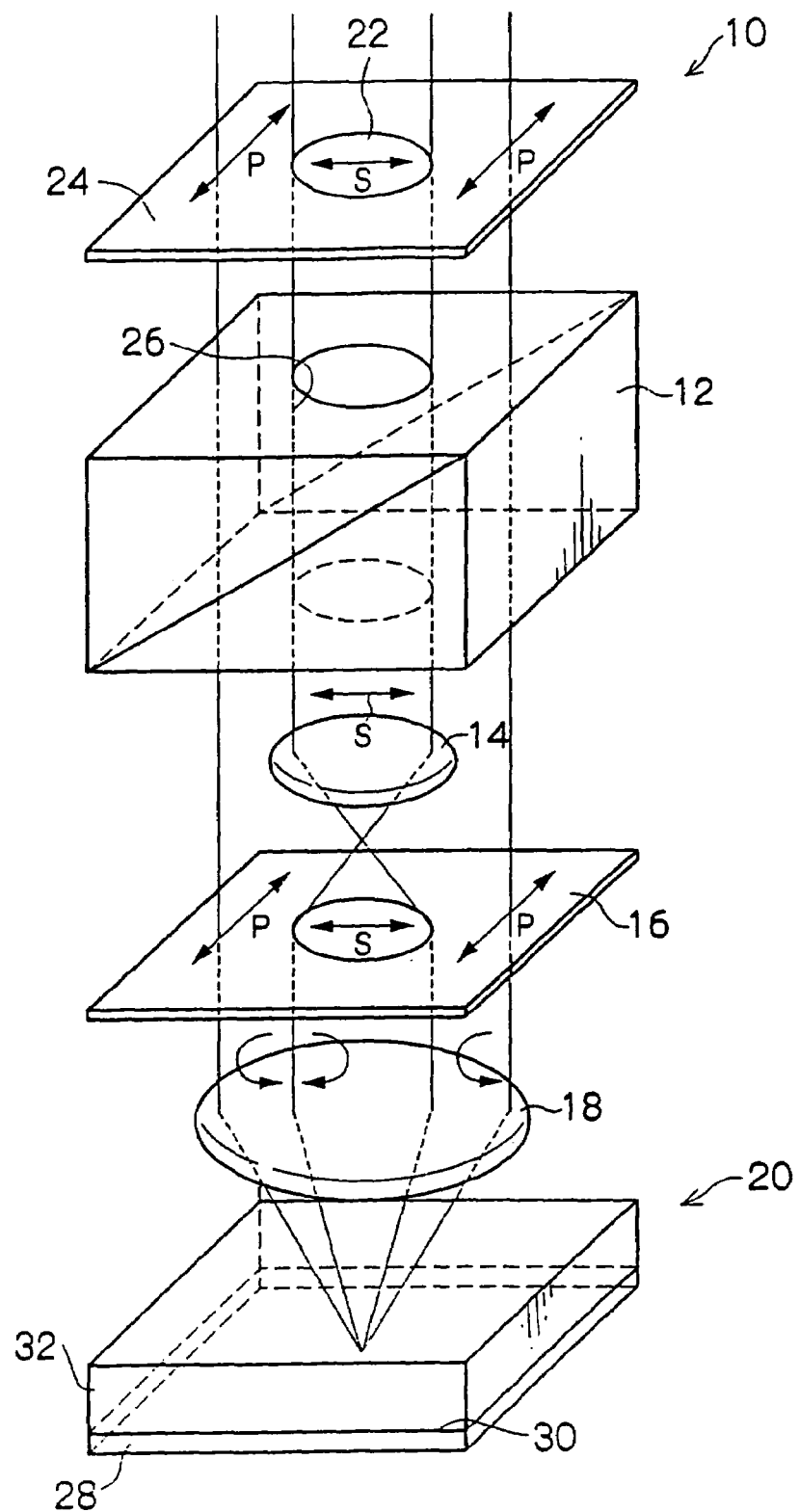
FIG. 1 is a perspective view showing a configuration of an optical recording apparatus according to a first embodiment of the present invention.

As shown in FIG. 1, an optical recording apparatus according to a first embodiment of the present invention includes a spatial light modulator 10 which modulates coherent light from a light source (not shown) to generate signal light and reference light whose polarization directions are crossed at right angles with each other, a polarizing beam splitter 12 which is arranged only on a light path of the generated signal light and separates a predetermined polarization component, a light diffuser 14 which is arranged only on a light path of the generated reference light and is a holographic optical element controlling a wavefront of the reference light, a quarter wavelength plate 16 which converts the signal light transmitted through the polarizing beam splitter 12 and the reference light transmitted through the light diffuser 14 into circularly polarized light, and a condenser lens 18 which condenses the generated circularly polarized light into a predetermined area of an optical recording medium 20. The spatial light modulator 10 is controlled according to an input signal by a control apparatus (not shown).

A transmissive spatial light modulator, in which transparent electrodes are formed on both surfaces of an electro-optical conversion material such as liquid crystal, can be used as the spatial light modulator 10. For example, a liquid crystal panel for a projector can be cited as this type of spatial light modulator. The liquid crystal panel for the projector includes transmissive liquid crystal cells in which electrodes are formed on the both surfaces of the liquid crystal, and polarizing plates are arranged on light input/output sides of the liquid crystal cells.

In the first embodiment, light passing through a circular area 22 in a central portion of the spatial light modulator 10 is set to s-polarized reference light, and light passing through other area 24 present is set to p-polarized signal light. Therefore, in the case of using the liquid crystal panel for the projector, it is necessary to remove a portion corresponding to the area 22 of the polarization plate arranged on the light output side or to make the portion transparent.

In the spatial light modulator 10, intensity of the light incident to each pixel is modulated by turning on and off each of a plurality of pixels two-dimensionally arranged according to bit information corresponding to two-dimensional data. Accordingly, in the signal light which has passed through the area 24, intensity modulation is carried out according to the signal to be recorded.

The polarizing beam splitter 12 is arranged only on the light path of the signal light generated by the spatial light modulator 10. In the embodiment, a passing hole 26 having a diameter corresponding to the area 22 of the spatial light modulator 10 is formed in the central portion of the plate-shaped polarizing beam splitter 12, and the reference light generated in the area 22 passes through the passing hole 26 without being reflected by the polarizing beam splitter 12.

The light diffuser 14 is a kind of the holographic optical element (HOE). Other HOEs which are previously designed so that light has a desired wavefront on a recording surface may be used instead of the light diffuser 14. For example, it is desirable that the HOE generates light which has the light intensity including a whole distribution of a signal light on the recording surface and whose phase is random. Using such an HOE can prevent needless exposure on the recording surface and realize volume multiple recording by shift of the recording medium or a recording apparatus. In the embodiment, the above-described shift multiple recording is realized in such a manner that only a required minimum recording spot is irradiated with the reference light, by combining the light diffuser 14 and the condenser lens 18.

The optical recording medium 20 includes a substrate 28 and a recording layer 32 having a polarization sensitivity, which is formed on the substrate 28 through a reflection layer 30 and able to record a polarization state. In the recording, the irradiation of the signal light and the reference light is carried out from the recording layer 32 side as shown in FIG. 1. Materials suitable for the optical recording medium 20 and the like are described later.

In the optical recording apparatus, in recording a hologram, the coherent light emitted from the light source (not shown) is modulated by the spatial light modulator 10 to generate the signal light and the reference light whose polarization directions are crossed at right angles with each other. The s-polarized reference light and the p-polarized signal light are generated in the embodiment.

The signal light generated corresponding to the area 24 of the spatial light modulator 10 passes through the polarizing beam splitter 12, and the signal light is incident to the quarter wavelength plate 16. On the other hand, the reference light generated corresponding to the area 22 directly passes through the passing hole 26 without being reflected by the polarizing beam splitter 12, and then the reference light is diffused by the light diffuser 14 and is incident to the quarter wavelength plate 16.

The quarter wavelength plate 16 converts the s-polarized reference light and the p-polarized signal light into circularly polarized light in which the reference light and the signal light revolve in directions opposite to each other. Then, the reference light and the signal light are condensed by the condenser lens 18, and the predetermined area of the optical recording medium 20 is simultaneously irradiated with the reference light and the signal light. Thus, a hologram is recorded in the recording layer 32 of the optical recording medium 20. The reference light and the signal light are generated by modulating the incident light from the same light source and are coaxially incident to the polarizing beam splitter 12. Accordingly, even if vibration is applied to the apparatus, the optical axes of the reference light and the signal light are never shifted.

The above-described optical recording apparatus can be also used as an optical reproducing apparatus which reads out (reproduces) the recorded information. In reproducing the hologram, only the reference light is generated by modulating the coherent light emitted from the light source with the spatial light modulator 10. The generated reference light is diffused by the light diffuser 14 and converted into the circularly polarized light with the quarter wavelength plate 16, and the optical recording medium 20 is irradiated with the reference light through the condenser lens 18.

When the optical recording medium 20 is irradiated with the reference light, the reference light is diffracted by the recorded hologram, and reproducing light having the circular polarization revolving in the reverse direction is generated. The quarter wavelength plate 16 converts the generated reproducing light having the circular polarization into linearly polarized light. In the case of irradiation of the s-polarized reference light, the p-polarized light is obtained by converting the reproducing light having the circular polarization into linearly polarized light. The linearly polarized reproducing light is reflected by the polarizing beam splitter 12 and detected by a photodetector (not shown) which is arranged in a reflecting direction of the polarizing beam splitter 12.

Even if the circularly polarized reference light, with which the optical recording medium 20 has been irradiated, is reflected by the reflection layer 30, the reflected light is converted with the quarter wavelength plate 16 into the linearly polarized light in the same polarization direction as that of the incident reference light, and the reflected light directly passes through the passing hole 26 without being reflected by the polarizing beam splitter 12. Accordingly, the reflected light is never detected by the photodetector (not shown) as a noise. Further, even if the reproducing light is scattered on the surface of the recording layer 32, the reproducing light is converted into the linearly polarized light with the quarter wavelength plate 16 and passes through the polarizing beam splitter 12. Accordingly, also in this case, the reproducing light is never detected by the photodetector (not shown) as a noise.

As described above, in the embodiment, the signal light and the reference light which are used for the recording of a hologram are generated by modulating the light emitted from the same light source with the spatial light modulator and are coaxially incident to the polarizing beam splitter. Therefore, even if the vibration is applied to the apparatus, the optical axes of the reference light and the signal light are never shifted and the apparatus has excellent resistance against vibration.

Even if the reference light with which the optical recording medium has been irradiated in the reproducing is reflected, the reference light passes through the passing hole without being reflected by the polarizing beam splitter. Further, even if the reproducing light is reflected on the surface of the recording layer, the reproducing light is converted into linearly polarized light with the quarter wavelength plate and passes through the polarizing beam splitter. In any case, the needless light is not detected as a noise, and the apparatus has excellent resistance against noise.

[Second Embodiment]

Figure 2:
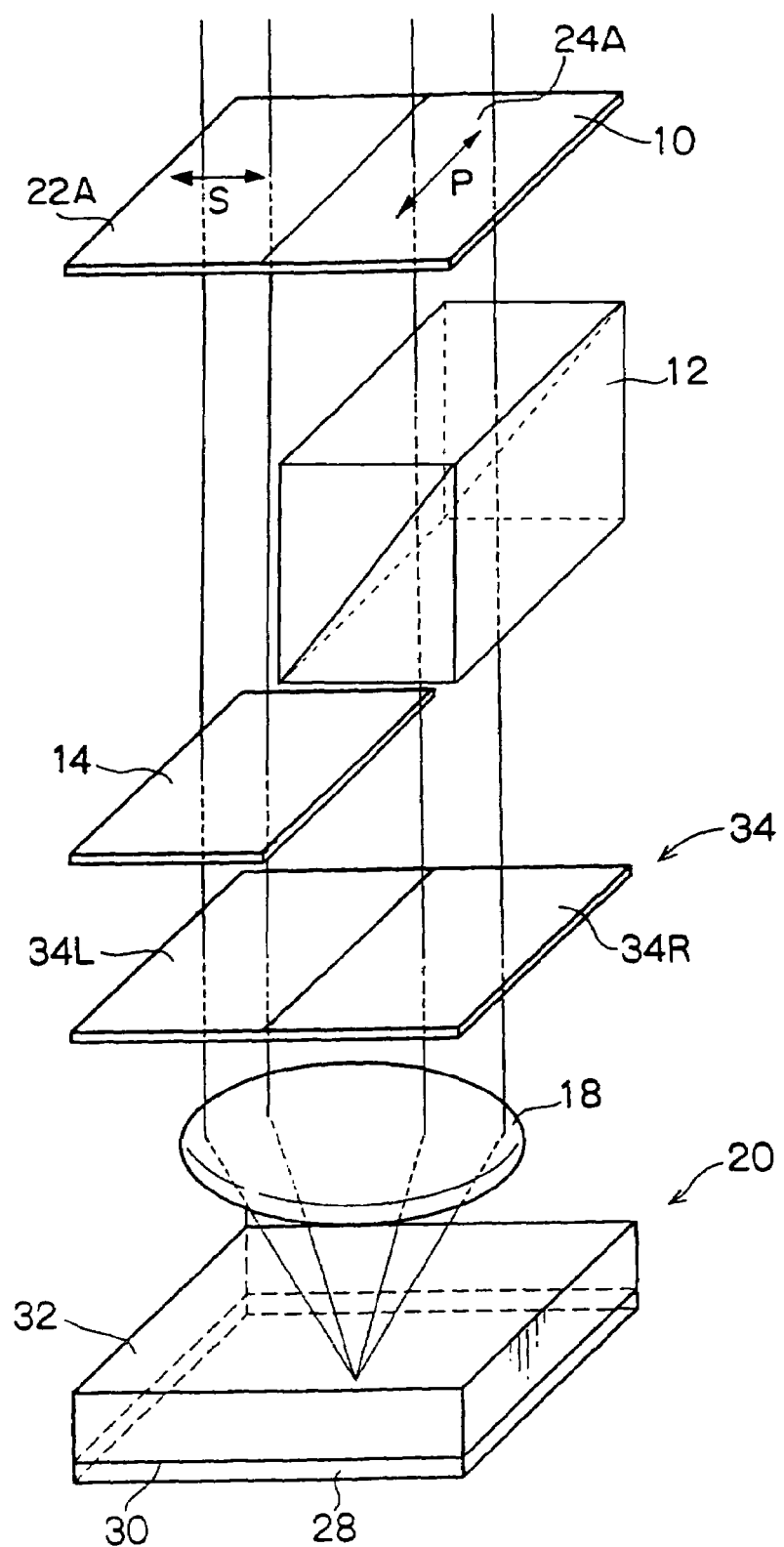
FIG. 2 is a perspective view showing a configuration of an optical recording apparatus according to a second embodiment of the present invention.

As shown in FIG. 2, an optical recording apparatus according to a second embodiment of the present invention has the same configuration for the optical recording apparatus according to the first embodiment except that a left half of the spatial light modulator 10 is set to a reference light area 22A, a right half of the spatial light modulator 10 is set to a signal light area 24A, and a two-split azimuth rotator plate 34 is arranged so as to correspond to each area instead of the quarter wavelength plate. Accordingly, the same component is indicated with the same reference numeral and its description is omitted.

In the second embodiment, light which has passed through the left-half area 22A of the spatial light modulator 10 is set to s-polarized reference light, and light which has passed through the right-half area 24A of the spatial light modulator 10 is set to p-polarized reference light. Therefore, in the case of using a liquid crystal panel for a projector, it is necessary to remove a portion corresponding to the area 22A of the polarization plate arranged on the light output side or to make the portion transparent.

In the spatial light modulator 10, intensity of the light incident to each pixel by turning on and off each of a plurality of pixels two-dimensionally arranged according to bit information corresponding to two-dimensional data. Accordingly, in the signal light which has passed through the area 24A, the intensity modulation is carried out according to the signal to be recorded.

The two-split azimuth rotator plate 34 includes an azimuth rotator plate 34L and an azimuth rotator plate 34R, the azimuth rotator plate 34L is arranged corresponding to the left-half area 22A, and the azimuth rotator plate 34R is arranged corresponding to the right-half area 24A. The polarization direction of the light which has passed through the azimuth rotator plate 34L is rotated by +45°, and the polarization direction of the light which has passed through the azimuth rotator plate 34R is rotated by −45°.

In the above optical recording apparatus, in recording a hologram, the coherent light emitted from the light source is polarization-modulated with the spatial light modulator 10 to generate the signal light and the reference light whose polarization directions are crossed at right angles with each other. The s-polarized reference light and the p-polarized signal light are generated in the embodiment.

The signal light generated corresponding to the area 24A of the spatial light modulator 10 passes through the polarizing beam splitter 12 and is incident to the azimuth rotator plate 34R. On the other hand, the reference light generated corresponding to the area 22A is diffused by the light diffuser 14 and is incident to the azimuth rotator plate 34L.

The polarization directions of the s-polarized reference light and the p-polarized signal light are rotated by the azimuth rotator plate 34L and the azimuth rotator plate 34R of the two-split azimuth rotator plate 34, respectively. The signal light and the reference light whose polarization directions have been rotated are condensed by the condenser lens 18, the predetermined area of the optical recording medium 20 is simultaneously irradiated with the signal light and the reference light, and the hologram is recorded in the recording layer 32 of the optical recording medium 20.

In the reproducing of the hologram, the reference light generated by the spatial light modulator 10 is diffused by the light diffuser 14, the polarization direction of the reference light is rotated by the azimuth rotator plate 34L, and the optical recording medium 20 is irradiated with the reference light through the condenser lens 18.

When the optical recording medium 20 is irradiated with the reference light, the reference light is diffracted by the recorded hologram, and reproducing light is generated. The polarization direction of the generated reproducing light is rotated by the two-splitazimuth rotator plate 34. For example, in the case of the irradiation of the s-polarized reference light, the obtained reproducing light becomes p-polarized light. The reproducing light whose polarization direction is crossed at right angles with that of the reference light is reflected by the polarizing beam splitter 12 and detected by the photodetector (not shown) which is arrange in the reflecting direction of the polarizing beam splitter 12.

Even if the reference light with which the optical recording medium 20 has been irradiated is reflected by the reflection layer 30, the reflected light is converted with the two-splitazimuth rotator plate 34 into linearly polarized light in the same polarization direction as that of the incident reference light, and the reflected light directly passes through without being reflected by the polarizing beam splitter 12. Accordingly, the reflected light is never detected by the photodetector (not shown) as a noise.

As described above, in the second embodiment, similarly to the first embodiment, the signal light and the reference light which are used for the recording of a hologram are generated by modulating the light emitted from the same light source with the spatial light modulator and are coaxially incident to the polarizing beam splitter. Therefore, even if the vibration is applied to the apparatus, the optical axes of the reference light and the signal light are never shifted, and the apparatus has excellent resistance against vibration.

Even if the reference light with which the optical recording medium has been irradiated in the reproducing is reflected, the reference light passes through the passing hole without being reflected by the polarizing beam splitter. Accordingly, the needless light is not detected as a noise, and the apparatus has excellent resistance against noise.

(Optical Recording Medium)

As mentioned above, the recording medium 20 includes the recording layer 32 having polarization sensitivity, which is formed on the substrate 28 through the reflection layer 30 and able to record the polarization state. Constitution of each layer will be described below in detail.

A quartz substrate, a glass substrate, and a plastic substrate can be used as the substrate 28. For example, polycarbonate; acrylic resin such as polymethyl methacrylate; vinyl chloride resin such as poly vinyl chloride and vinyl chloride copolymer; epoxy resin; amorphous polyolefin; and polyester can be cited as the material of the plastic substrate. From viewpoints of humidity resistance, dimensional stability, price, and the like, polycarbonate is particularly preferable. It is preferable that the thickness of the substrate 28 is in the range from 0.1 to 2 mm.

Cr, Ni, Pt, Cu, Ag, Au, Al, and stainless steel, and an alloy of these metals can be used as the reflection layer 30. The reflection layer 30 can be formed on the substrate by evaporation, sputtering, or ion plating of these materials. It is preferable that the thickness of the reflection layer 30 is in the range from 0.1 to 2 μm.

The recording layer 32 may be formed from any material, if the material is a polarization-sensitive material showing optically induced birefringence and being able to record the above-described polarized hologram regardless of a value of a polarized angle between the signal light and the reference light. Polymer or polymer liquid crystal having a photoisomerizing group in a side chain or polymer in which isomerizing molecules are dispersed can be cited as the preferable material. For example, the material containing an azobenzene structure is preferable for the photoisomerizing group or molecule.

A principle of the optically induced birefringence will be described here taking azobenzene as an example. As shown in the following chemical formula, azobenzene shows the photoisomerization of trans-cis by the irradiation of the light. Before the optical recording layer is irradiated with the light, trans-azobenzene is dominant in the optical recording layer. These molecules are randomly oriented and isotropic from a macroscopic viewpoint. When the optical recording layer is irradiated with the linearly polarized light from a predetermined direction shown by an arrow, trans 1-azobenzene having an absorption axis in the same orientation as the polarization direction of the light is selectively photoisomerized into cis-azobenzene. The molecule relaxed into trans 2-azobenzene having the absorption axis crossed at right angles with the polarization direction does not absorb the light any more and is fixed at the state of trans 2-azobenzene.

As a result, from a macroscopic viewpoint, anisotropy of an absorption coefficient and the refractive index, i.e., dichroism and the birefringence are induced. Generally, these characteristics are referred to as optically induced birefringence, optically induced dichroism, or optically induced anisotropy. The excited anisotropy can be erased by irradiating azobenzene with circularly polarized light or unpolarized light.

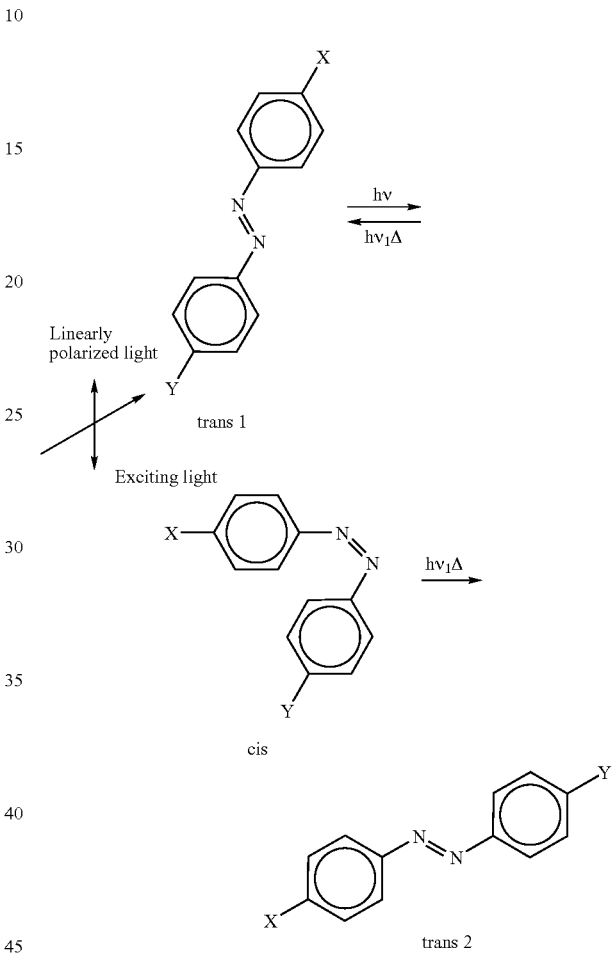

In polymer containing the photoisomerizing group, the orientation of the polymer itself can be also changed by the photoisomerization to induce a large birefringence. The induced birefringence is stable not higher than the glass transition temperature of the polymer and preferable for the recording of the hologram.

Polyester having azobenzene in its side chain shown by the following chemical formula (1) can be cited as a preferable example of the material constituting the recording layer 32. This polyester can record intensity and polarization direction of the signal light as the hologram by the optically induced anisotropy caused by the photoisomerization of azobenzene of the side chain. Polyester having cyanoazobenzene in its side chain is particularly preferable among these azopolymers ("Holographic recording and retrieval of polarized light by use of polyester containing cyanoazobenzene units in the side chain", K. Kawano, T. Ishii, J. Minabe, T. Niitsu, Y. Nishikata and K. Baba, Opt. Lett. Vol. 24 (1999) pp. 1269–1271).

Chemical formula (1)

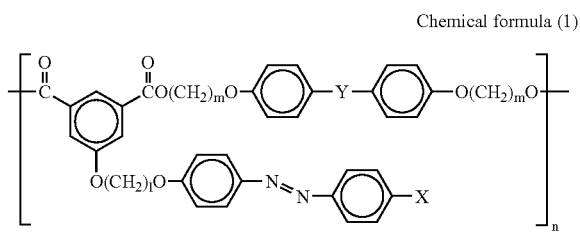

Where X indicates a cyano group, a methyl group, a methoxy group, or a nitro group and Y indicates a bivalent linkage group having ether linkage, ketone linkage, or sulfone linkage. l and m indicate an integer from 2 to 18, more preferably an integer from 4 to 10, and n indicates an integer from 5 to 500, more preferably an integer from 10 to 100.

The optical recording medium 20 including the recording layer 32 made of the above-described polyester material can be produced by, e.g., casting polyester in a chloroform solution on a cleaned glass substrate and drying it. When an absorption spectrum of the optical recording medium 20 in which the recording layer 32 having a thickness of 20 μm is formed was measured, the spectrum having a peak near 365 nm corresponding to $\pi$-$\pi$* transition of azobenzene was obtained.

The method of producing the optical recording medium is not limited to the above-description. For example, the optical recording medium may be produced by spin-coating the material of the recording layer 32 on the substrate, or the optical recording medium may be produced by injecting the material of the recording layer 32 into a plane-parallel plate cell. The optical recording medium can be also produced by bonding the material of the recording layer 32 to the film-shaped substrate with a hot press.

The principle that a hologram is recorded in the optical recording medium including the recording layer having the polarization-sensitive properties will be described below.

In the case that the hologram is recorded in the optical recording medium 20 including the recording layer 32 having polarization sensitivity, one area of the optical recording medium 20 is simultaneously irradiated with coherent signal light 1 and coherent reference light 2.

Figure 3A:
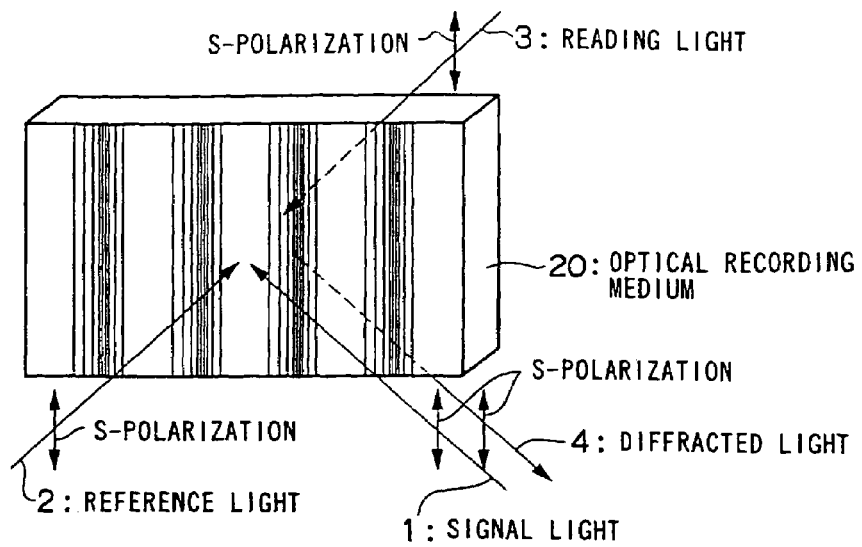
FIG. 3A is a schematic representation explaining a hologram caused by a light intensity distribution.

The case in which polarization directions of the signal light 1 and the reference light 2 are parallel to each other will be described. For example, as shown in FIG. 3A, a light intensity distribution is generated by the two-beam interference between the signal light 1 and the reference light 2 in the optical recording medium 20 when both the signal light 1 and the reference light 2 are s-polarized light. A change in orientation of azobenzene is caused only in an area where the light intensity is strong. Accordingly, a lattice of absorption index or refractive index corresponding to the light intensity distribution is recorded as the hologram.

Figure 3B:
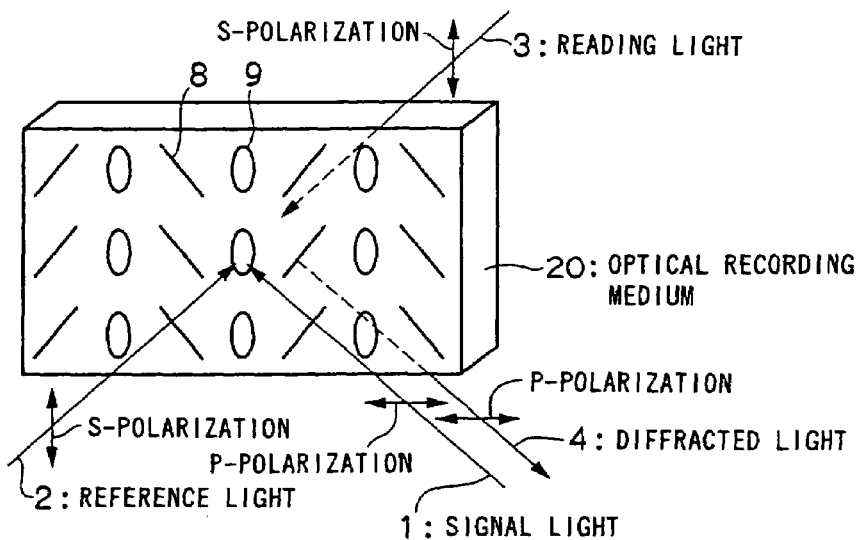
FIG. 3B is a schematic representation explaining a hologram caused by a polarization distribution.
Figure 3C:
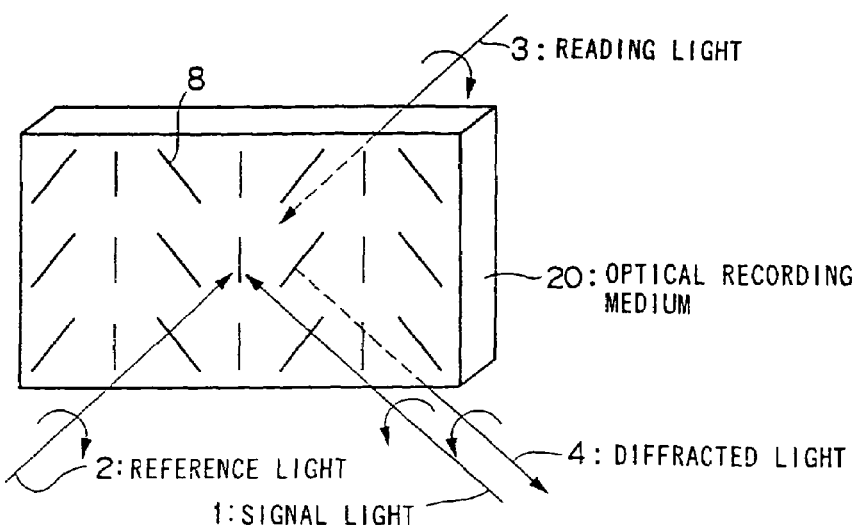
FIG. 3C is a schematic representation explaining the hologram caused by a polarization distribution.
Figure 4:
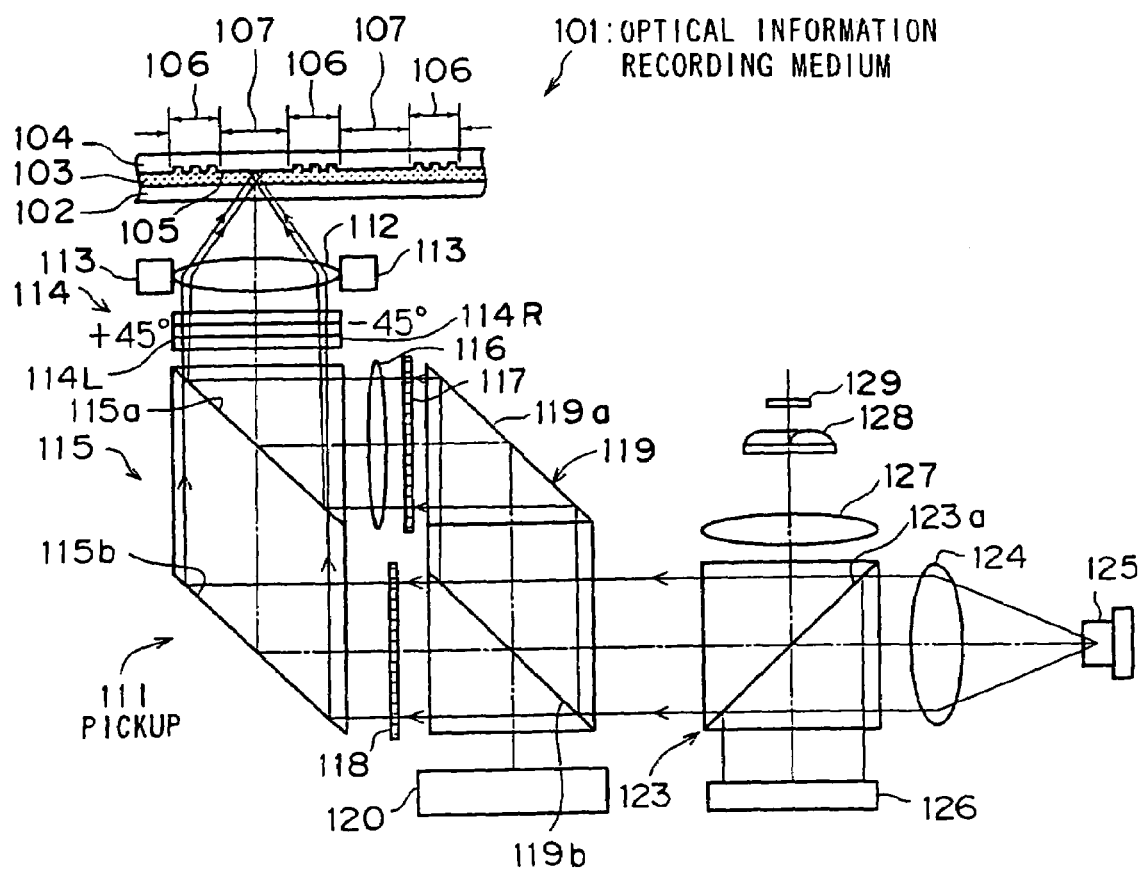
FIG. 4 is a schematic drawing explaining a recording method of a conventional polarized collinear recording.
Figure 5:
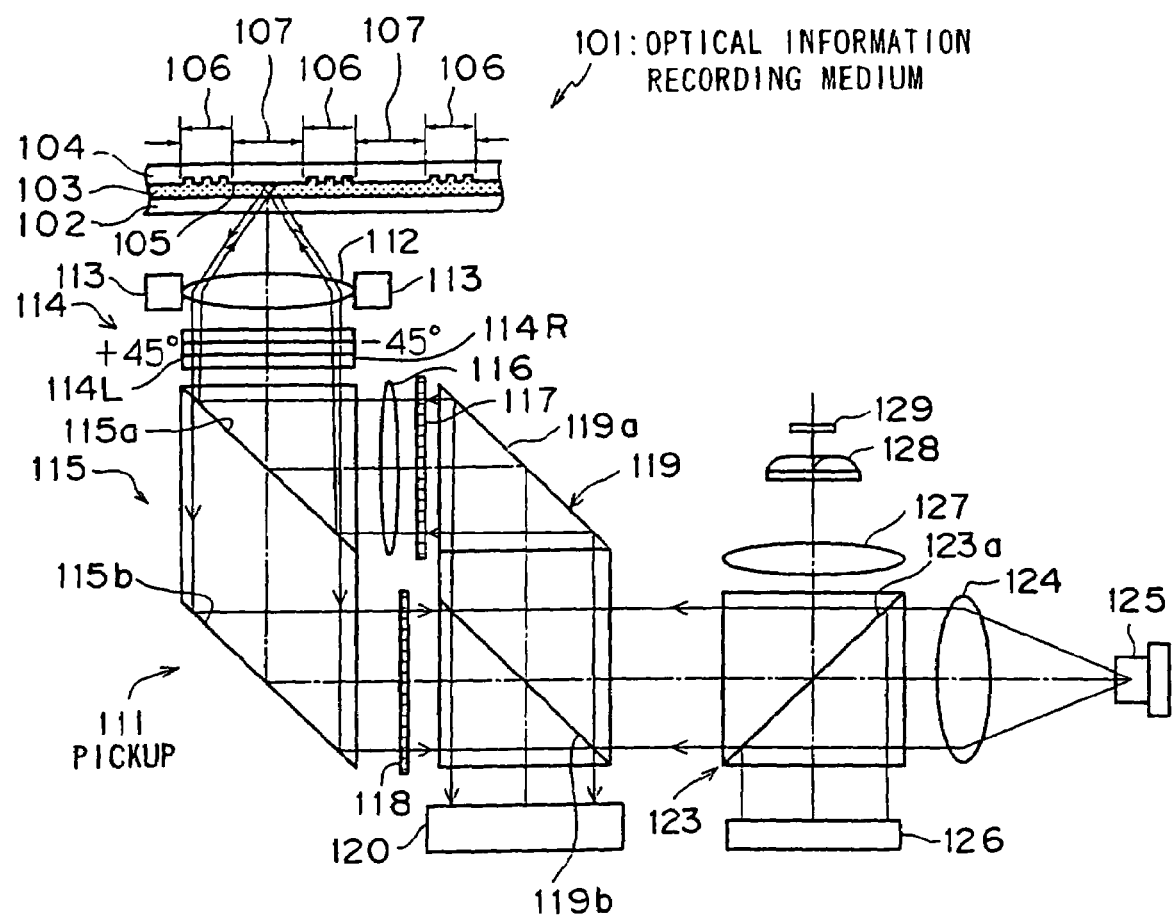
FIG. 5 is a schematic drawing explaining a reproducing method of the conventional polarized collinear recording.

On the contrary, the case in which polarization directions of the signal light 1 and the reference light 2 are crossed at right angles with each other will be described. For example, as shown in FIG. 3B, when the signal light 1 is p-polarized light and the reference light 2 is s-polarized light, the light intensity distribution is not generated unlike the case in which the signal light 1 and the reference light 2 are parallel to each other. However, the polarization direction is spatially and periodically modulated, and a linear polarization part 8 and an elliptical polarization part 9 appear alternately and periodically. As shown in FIG. 3C, in the case that the signal light 1 and the reference light 2 are the circularly polarized light and polarization directions of the signal light 1 and the reference light 2 are crossed at right angles with each other, a synthetic electric field has an electric field arrangement in which angles of the linear polarization are spatially distributed. In those cases, though the light intensity distribution also becomes uniform, the change in orientation of azobenzene is caused according to the modulated polarization distribution, so that a type of lattice having the absorption index or the refractive index, in which directional properties are spatially different, is recorded as the hologram.

The hologram caused by the light intensity distribution in the case that the polarization directions of the signal light 1 and the reference light 2 are parallel to each other as shown in FIG. 3A is referred to as a light intensity hologram, and the hologram caused by the polarization distribution in the case that the polarization directions of the signal light 1 and the reference light 2 are crossed at right angles with each other as shown in FIGS. 3B and 3C is referred to as a polarization hologram.

Thus, according to the optical recording medium 20 including the recording layer 32 made of polymer or polymer liquid crystal having azobenzene in the side chain or polymer in which azobenzene is dispersed, even if the polarization directions of the signal light 1 and the reference light 2 are parallel to each other or crossed at right angles with each other, as a result of the induced anisotropy of azobenzene, the hologram can be recorded.

In each of the above-described cases, when a polarization direction of hologram reading light 3 is set to the same direction as that of the reference light 2, diffracted light 4 having the same polarized state as that of the signal light 1 can be obtained. The recorded hologram is held without relaxation for more than several years under natural light and at room temperature.

Though the example in which the recording is carried out to the optical recording medium including the recording layer having the polarization-sensitive properties in the embodiment, the recording layer may be formed from any material which can record a hologram by changing the refractive index or the absorption index, when an optical reproducing apparatus is prepared in addition to the optical recording apparatus.

What is claimed is:

1. An optical recording apparatus for recording a hologram in an optical recording medium, comprising:
    a spatial light modulator which modulates light incident from a single light source and generates signal light and reference light, the spatial light modulator modulating the signal light according to a signal to be recorded in the optical recording medium to cause a polarization direction of the signal light to have a predetermined polarization direction and to cause a polarization direction of the reference light to have a polarization direction crossed at right angles with the predetermined polarization direction;
    an azimuth rotator which rotates the polarization directions by a predetermined angle, the rotated signal light and rotated reference light being linearly polarized light; and
    a condensing optical system which condenses the linearly polarized light, whose polarization directions have been rotated by the azimuth rotator, into a predetermined area of the optical recording medium.

2. An optical recording apparatus according to claim 1, wherein a holographic optical element for forming a predetermined wavefront for the reference light is further arranged between the spatial light modulator and the azimuth rotator.

3. An optical recording apparatus according to claim 2, wherein the holographic optical element is a light diffuser which diffuses the reference light.

4. An optical recording apparatus according to claim 1, wherein the spatial light modulator comprises a transmissive liquid crystal cell in which transparent electrodes are formed on both surfaces of a plate-shaped liquid crystal, a first polarizing plate which is arranged on a light incident side of the liquid crystal cell and transmits light of the predetermined polarization direction, and a second polarizing plate which is arranged on a light outgoing side of the liquid crystal cell and has a first region that transmits light of any polarization direction and a second region that transmits light of the predetermined polarization direction.

5. An optical recording apparatus according to claim 4, wherein the spatial light modulator is a liquid crystal panel for a projector.

6. An optical recording apparatus according to claim 4, wherein the azimuth rotator includes a first area and a second area corresponding to the first region and the second region of the spatial light modulator, the polarization direction of the light which passes through one of the first area and the second area of the azimuth rotator is rotated by +45° and the polarization direction of the light which passes through the other area is rotated by −45°.

* * * * *